(12) United States Patent
Görgen et al.

(10) Patent No.: US 9,398,568 B2
(45) Date of Patent: Jul. 19, 2016

(54) SYSTEM AND METHOD FOR OPTIMIZING DATA TRANSMISSION TO NODES OF A WIRELESS MESH NETWORK

(75) Inventors: Daniel Martin Görgen, Eindhoven (NL); Javier Espina Perez, Eindhoven (NL); Tim Corneel Wilhelmus Schenk, Eindhoven (NL); Oscar Garcia Morchon, Aachen (DE)

(73) Assignee: Koninklijkle Philips Electronics N.V., Eindhoven (NL)

( * ) Notice: Subject to any disclaimer, the term of this patent is extended or adjusted under 35 U.S.C. 154(b) by 276 days.

(21) Appl. No.: 13/988,389

(22) PCT Filed: Nov. 10, 2011

(86) PCT No.: PCT/IB2011/055026
§ 371 (c)(1),
(2), (4) Date: May 20, 2013

(87) PCT Pub. No.: WO2012/069950
PCT Pub. Date: May 31, 2012

(65) Prior Publication Data
US 2013/0242929 A1 Sep. 19, 2013

(30) Foreign Application Priority Data

Nov. 24, 2010 (EP) ..................................... 10192560

(51) Int. Cl.
*H04W 72/04* (2009.01)
*H04L 12/721* (2013.01)
*H04W 40/24* (2009.01)

(52) U.S. Cl.
CPC ........... *H04W 72/0406* (2013.01); *H04L 45/36* (2013.01); *H04W 40/248* (2013.01)

(58) Field of Classification Search
CPC ......................... H04W 40/00; H04W 72/0406
See application file for complete search history.

(56) References Cited

U.S. PATENT DOCUMENTS

| 7,733,908 | B1 | 6/2010 | Evans |
| 2005/0102443 | A1 | 5/2005 | Mahany |
| 2006/0077974 | A1* | 4/2006 | Goossens ................ H04L 45/00 370/389 |
| 2006/0114940 | A1* | 6/2006 | Cho ....................... G01D 21/00 370/498 |
| 2007/0180134 | A1 | 8/2007 | Steinbach |
| 2007/0248065 | A1* | 10/2007 | Banerjea et al. .............. 370/338 |
| 2008/0002740 | A1 | 1/2008 | Ramachandran |

(Continued)

FOREIGN PATENT DOCUMENTS

| CN | 101150518 A | 3/2008 |
| CN | 101646218 A | 2/2010 |

(Continued)

OTHER PUBLICATIONS

Yu, Xin, "Distributed Cace Updating for the Dynamic Source Routig Protocol", IEEE Transactions on Mobile Computing, vol. 5, No. 6, Jun. 2006.

*Primary Examiner* — Brandon Renner
*Assistant Examiner* — Deepa Belur

(57) ABSTRACT

For improving data packet transmission from a collector node to one or more network nodes without additional routing protocols or increase of the overall network load, a system and a method are provided, wherein a node and/or the collector node receiving an uplink data packet addressed to the collector node is adapted to store at least a sender node information and a transmitting node information as a reverse-route information for a predetermined time.

11 Claims, 7 Drawing Sheets

(56) References Cited

U.S. PATENT DOCUMENTS

| | | | |
|---|---|---|---|
| 2008/0084330 A1* | 4/2008 | Picard | 340/870.02 |
| 2008/0316951 A1* | 12/2008 | Zeng et al. | 370/312 |
| 2009/0154395 A1 | 6/2009 | Park | |
| 2009/0196227 A1 | 8/2009 | Bahr | |
| 2009/0279487 A1* | 11/2009 | Reumerman et al. | 370/329 |
| 2010/0128652 A1 | 5/2010 | Lee | |
| 2010/0177753 A1* | 7/2010 | Bahr | 370/338 |
| 2012/0008578 A1* | 1/2012 | Kant et al. | 370/329 |
| 2014/0369359 A1* | 12/2014 | Kondo et al. | 370/400 |

FOREIGN PATENT DOCUMENTS

| | | |
|---|---|---|
| CN | 101651658 A | 2/2010 |
| WO | 2007127174 A2 | 11/2007 |
| WO | 2009128755 A1 | 10/2009 |
| WO | 2011145027 A1 | 11/2011 |

* cited by examiner

| Destination node information | Next node information |
|---|---|
| Sender node information | Transmitting node information |

| Reverse-route information at node | Destination node information | Next node information |
|---|---|---|
| N1 | A | A |
| N2 | A | N1 |
| Collector node 50 | A | N2 |

SYSTEM AND METHOD FOR OPTIMIZING DATA TRANSMISSION TO NODES OF A WIRELESS MESH NETWORK

FIELD OF THE INVENTION

The invention relates to a system and a method for controlling data packet transmissions in a wireless mesh network.

BACKGROUND OF THE INVENTION

Recently, wireless mesh networks attract more and more attention, e.g. for remote control of illumination systems, building automation, monitoring applications, sensor systems and medical applications. In particular, a remote management of outdoor luminaires, so-called telemanagement, becomes increasingly important. On the one hand, this is driven by environmental concerns, since telemanagement systems enable the use of different dimming patterns, for instance as a function of time, weather conditions and season, allowing a more energy-efficient use of the outdoor lighting system. On the other hand, this is also driven by economical reasons, since the increased energy efficiency also reduces operational costs. Moreover, the system can remotely monitor power usage and detect lamp failures, which allows determining the best time for repairing luminaires or replacing lamps.

Current radio-frequency (RF) based wireless solutions use either a star network topology or a mesh network topology. In a star network, a control center has a direct wireless communication path to every node in the network. However, this typically requires a high-power/high-sensitivity base-station-like control center to be placed at a high location (e.g. on top of a building), which makes the solution cumbersome to deploy and expensive. In a mesh network, the plurality of nodes does in general not communicate directly with the control center, but via so-called multi-hop communications. In a multi-hop communication, a data packet is transmitted from a sender node to a destination node via one or more intermediate nodes. Nodes act as routers to transmit data packets from neighboring nodes to nodes that are too far away to reach in a single hop, resulting in a network that can span larger distances. By breaking long distances in a series of shorter hops, signal strength is sustained. Consequently, routing is performed by all nodes of a mesh network, deciding to which neighboring node the data packet is to be sent. Hence, a mesh network is a very robust and stable network with high connectivity and thus high redundancy and reliability.

In the prior art, mesh network transmission techniques can be divided in two groups: flooding-based and routing-based mesh networks. In a flooding-based mesh network, all data packets are forwarded by all nodes in the network. Therefore, a node does not have to make complicated routing decisions, but just broadcasts the data packet. By these means, the technique is quite robust. However, in large networks, the data overhead due to forwarding impacts the overall data rate. Moreover, collisions of data packets are more likely to occur, further reducing the overall performance. Hence, the main problem of this solution is the scalability. Routing-based mesh networks can be further divided into proactive and reactive schemes. In proactive routing-based mesh networks, all needed network paths are stored in routing tables in each node. The routing tables are kept up to date, e.g. by sending regular beacon messages to neighboring nodes to discover efficient routing paths. Although the data transmission is very efficient in such kind of network, the scalability is still low, since in big networks, the proactive update of the routing tables consumes large parts of network resources. Moreover, the routing tables will grow with the scale of the network. In addition, the setup of the network requires time and resources in order to build up the routing tables. Reactive schemes, in contrast, avoid the permanent overhead and large routing tables by discovering routes on demand. They use flooding to discover network paths and cache active routes or nodes. When routes are only used scarcely for single data packets, flooding the data packets instead of performing a route discovery might be more efficient. If routes are kept long enough to avoid frequent routing, reactive schemes degenerate to proactive schemes. An example for a reactive routing-based mesh network protocol is used in ZigBee. However, the main problem of this protocol scheme is still the scalability of the network.

In most sensor/actuator networks, network nodes communicate in general only with a collector node acting as a bridge or gateway to the control center, whereas the collector node (or the control center) is the only entity communicating with individual nodes or a group of nodes. Moreover, communications from the nodes to the control center generally prevail in the overall data traffic. Thus, in these networks, data packet transmission is often optimized from the nodes to the respective collector node, i.e. the underlying protocol is data collector oriented. But these protocols only improve the path towards the collector node. In order to transmit data from the collector node or control center to the individual nodes, either additional extensive routing protocols have to be stored at the single nodes or precise routing information has to be included in the data packets. Though, when using additional protocols, additional storage space for routing tables is required at the nodes, making the nodes and the system more complex. When including precise routing information in the data packet, however, a large data overhead is created, further increasing the network load and thus reducing the network scalability. As an alternative, flooding is often used. Yet, this is a very inefficient way to communicate with an individual node, also resulting in increased network traffic and thus lower scalability.

Moreover, in large-scale multi-hop networks, the number of hops a data packet has to travel is large as compared to a hop distance in small networks. Thus, in a large radio frequency telemanagement system comprising thousands of nodes, 20-40 hops are likely to occur. However, the delivery chance of an individual data packet decreases with its hop distance, since with every hop, there is a chance that the data packet gets lost. Hence, in order to guarantee successful delivery of a data packet, the data packet can be transmitted in acknowledged mode, wherein the receiver node transmits an acknowledgement to the sender node after having received the data packet. Since the receiver node mostly corresponds to the collector node, the acknowledgement has to be transmitted from the collector node to the sender node. However, the corresponding communication paths are very inefficient, as mentioned before, in particular when considering the low payload of an acknowledgement, usually only comprising a type of the data packet and a sequence number.

Hence, a big disadvantage in common wireless mesh networks is constituted on the one hand by the tedious configuration and on the other hand by very limited network scalability. Especially RF telemanagement networks suffer from significant overload due to their topology and size, which limits their scalability. Consequently, efficient routing protocols are required for data transmission from the data collector to individual network nodes or to a group of network nodes in large-scale wireless networks, such as street illumination systems with a high number of luminaire nodes, in order to achieve the required throughput, response times and robustness.

US 2009/0154395 A1 describes routing in a wireless sensor network having a hierarchical structure, wherein the network comprises a plurality of clusters, each with a plurality of nodes and a cluster head. The cluster head functions as a gateway between the nodes of the corresponding cluster to nodes of other clusters.

SUMMARY OF THE INVENTION

In view of above disadvantages and problems in the prior art, it is an object of the present invention to provide a system and a method for transmitting data packets in a wireless network, wherein data packet transmission from a collector node to one or more network nodes is improved, without additional routing protocols or increasing the overall network load.

The invention is based on the idea to exploit efficient routing from single nodes to a collector node for data packets transmitted the reverse way. For this, every node, which receives an uplink data packet directed to the collector node, temporarily stores information about the original sender node of the data packet and information about the preceding transmitting node, from which the data packet has been received. In the following, uplink data packet refers to a data packet sent from a node towards the collector node, whereas downlink data packet refers to a data packet sent from the collector node to one or more individual nodes.

According to one aspect of the present invention, a system for controlling data packet transmission in a wireless network is provided comprising a plurality of nodes and at least one collector node that may function as a gateway to a control center. When (or after) a node or a collector node receives a data packet directed or addressed to the collector node, this node or collector node stores for a predetermined time at least information about the sender node and about the transmitting node as reverse-route information. Data packet transmission in the wireless mesh network is preferably performed in a multi-hop mode. Thus, in case that the receiving node is not the collector node, the receiving node may be an intermediate or forwarding node in a multi-hop transmission. At least one of the sender node information and the transmitting node information may be included in the received uplink data packet. The sender node information may relate to an address or other identifying information for the node that has initiated the transmission of the data packet. Likewise, the transmitting node information may relate to an address or identifying information for the previous node, from which the data packet has been received. Preferably, the sender node information is temporarily stored as destination node information and the transmitting node information is temporarily stored as receiving node information in a route cache of the receiving node. If receiving a downlink data packet directed to the sender node of the uplink data packet, while the reverse-route information is being cached, the node may use the reverse-route information for forwarding the downlink data packet. By these means, a downlink data packet can be transmitted the reverse way as the uplink data packet. Since, in general, the uplink transmission follows a very efficient routing protocol, the downlink transmission can be improved this way, without requiring additional routing protocols or full routing information included in the downlink data packet. Thus, the idea of the invention relates to reverse-route caching.

The wireless network may have mesh topology, wherein each node may act as a router. Such a network has increased redundancy and reliability. Preferably, the nodes of the wireless network are stationary, as it is mainly the case for large outdoor lighting systems. Alternatively or additionally, the positions of at least some nodes may be known to at least some of the other nodes of the network. For instance, at least some of the nodes may store a routing table for uplink transmissions to a closest collector node. For uplink transmission, a routing protocol for data packet transmission to the collector node ("sink") may be based on sink-distance vector routing, also called many-to-one routing. Hence, a data packet is transmitted to the neighboring node that is closer to one of the collector nodes. By these means, data packet transmission becomes faster and more efficient. Moreover, this also allows to dispense with a large number of collector nodes in large wireless mesh networks, e.g. with a number of nodes exceeding 1000. Alternatively or additionally, routing tables may be stored at each node comprising routing information for forwarding an uplink data packet to the closest collector node. The uplink data packets may include reporting data related to at least one of detected events, sensor data and status data. For instance, in a lighting system, the luminaire nodes may report regularly a power status, ambience brightness detected by light sensors, operation status and the like.

Preferably, the caching time, i.e. the predetermined time, for which the receiving node stores the reverse-route information, depends on the receiving node. For instance, a node being close to the sender node may store the reverse-route information for a longer time than a node being close to the collector node or than the collector node itself. Thus, the caching time may depend on a distance of the respective node to the collector node, e.g. on a hop distance. In one example, the caching time of a node exceeds an average roundtrip time, i.e. the time required for forwarding the received uplink data packet from the node to the collector node plus the time required for receiving an acknowledgement for the uplink data packet from the collector node via the same intermediate nodes. However, the caching time may be chosen to be sufficiently short, so that no large route cache is required, since this might not be possible in many wireless devices. Thus, the lifetime of the reverse-route information may be short. Also the size of the route cache may vary depending on the node. Preferably, the route cache is large enough that reverse-route information corresponding to more than one sender node can be cached simultaneously. The predetermined time, for which the reverse-route information is kept at a node, may start when creating the reverse-route information. Alternatively, the predetermined time starts, when the node has forwarded a downlink data packet directed to the sender node A. By these means, the reverse route is still open or available for the predetermined time, after a first downlink data packet has been transmitted using the reverse-route information. This may be particularly useful, when several data packets are subsequently sent from the collector node to the same sender node A.

Possibly, a data field is included in an uplink data packet, indicating whether the reverse-route information is to be stored. Preferably, a node only stores the reverse-route information, if it is indicated by the data field or if the data field is included in an uplink data packet. Thus, if the data field is not included in the uplink data packet, no reverse-route information may have to be stored. The requirement of storing the reverse-route information may also be indicated by specifying how long the reverse-route information is to be stored. This may be achieved by including the caching time, i.e. the predetermined time, in the uplink data packet or in a downlink data packet, e.g. if the predetermined time starts with forwarding a downlink data packet using the reverse-route information. Alternatively, a node receiving the uplink data packet may be adapted to determine its individual caching time for storing the reverse-route information by multiplying the predetermined time specified in the uplink data packet with its hop distance to the collector node. Additionally or alternatively, a node may store the reverse-route information comprising the sender node information of a certain sender node A, until the node receives a downlink data packet directed to this sender node A, which comprises an erase information or erase command. When receiving a downlink data packet directed to the sender node A and comprising an erase information, the node may delete the reverse-route information corresponding to this sender node A, after having forwarded the downlink data packet using the reverse-route information. For instance, when a batch of downlink data packets has to be transmitted to the sender node A, the last packet, which has to travel over the reverse-route, may comprise an erase information, in order to free the route cache of the transmitting node. By these means, it can be guaranteed that the reverse route remains open, until the last downlink data packet has passed, while the reverse-route information is not kept unnecessarily long. In a further modification, a downlink data packet travelling over the reverse-route may contain a data field indicating to a transmitting node, whether and/or how long the reverse-route information has to be kept further. This is especially useful, if the collector node sends a plurality of data packets to the sender node A.

In a further embodiment, a node, which has received a downlink data packet to be forwarded to a sender node A, may select a transmission mode based on an availability of the reverse-route information corresponding to this sender node A. For instance, if the reverse-route information is not available any longer at this node, the node may use flooding or the like for forwarding the downlink data packet. The flooding may include hop count bounding, i.e. the flooding may be restricted to a certain area of the network. This may be based on a distance of the node to the sender node A. Therefore, other transmission modes such as flooding may be used from the point on, where no reverse-route information is available at an intermediate node, e.g. somewhere halfway of the downlink transmission from the collector node to the sender node A.

In a preferred embodiment, the collector node is adapted to postpone a transmission of a downlink data packet to a node, if a receipt of an uplink data packet is expected from this node. When transmitting the downlink data packet after having received the uplink data packet, the reverse-route information cached at the collector node and at the intermediate nodes can be used for transmitting the downlink data packet. Therefore, the downlink data packet may be transmitted from the collector node to the sender node of the uplink data packet via the same intermediate nodes, which have forwarded the uplink data packet. Thus, the same transmission path can be used for an uplink and a subsequent downlink transmission. Preferably, the collector node includes the sender node information as destination node information in the downlink data packet and transmits the downlink data packet to the intermediate node, from which the collector node has received the uplink data packet. Likewise, each intermediate node receiving the downlink data packet may compare the destination node information included in the downlink data packet with the stored sender node information. In case that the stored sender node information is identical with the destination node information of the downlink data packet, the node may forward the downlink data packet to the next intermediate node, which is related to the stored transmitting node information associated to the stored sender node information.

Preferably, the collector node only delays time-uncritical or delay-tolerant data packets. The delay time, i.e. the time, for which the collector node delays the transmission of the downlink data packet, may depend on the downlink data packet. For instance, the collector node may be adapted to determine an urgency of transmission for a downlink data packet and to set a maximum delay time accordingly.

The downlink data packet may include an acknowledgement, e.g. of the uplink data packet received from the sender node. Additionally or alternatively, the downlink data packet may comprise requested data and/or other data, for instance updates of protocols, schedules or the like. In a preferred embodiment, the downlink data packet and an acknowledgement of the received uplink data packet are transmitted as one data packet. Since acknowledgements have a large data overhead in particular when considering its low payload, the data overhead can be reduced by combining an acknowledgement with other data that have to be sent to the same node. This is also called piggybacking. However, in some cases, it may be required to transmit the downlink data packet separately from the acknowledgement of the uplink data packet. In this case, the downlink data packet and the acknowledgement should be transmitted as long as the reverse-route created during the uplink transmission is still available. Thus, the downlink data packet may be transmitted just before or after transmitting the acknowledgement of the uplink data packet.

In another embodiment, the collector node may be adapted to transmit a trigger message to one or more nodes, in order to create the respective reverse route information. For instance, the trigger message may relate to a notifying message that data is available at the collector node. The trigger message may be sent as a broadcast to all nodes or as a multicast to a group of nodes. The trigger message may be transmitted in flooding mode, wherein all nodes forward the message to every neighbor node except for the transmitting node, from which the message was received. After having received the trigger message, a node may send a data request to the collector node within a time interval specified in the trigger message. Preferably, the uplink transmission of the data request is performed as a routed unicast transmission. In response to the data request from the node, the collector node may transmit the requested data via the reverse route of the data request using the cached reverse-route information. By these means, it can be dispensed with flooded unicast transmissions for transmitting the data to each single node, thus avoiding excessive network load.

Moreover, by including a time interval in the trigger message, within which the nodes receiving the trigger message have to transmit their data requests, the data traffic can be shaped in respect of time. Preferably, the nodes randomly select a time-slot within the specified time interval for transmitting their data requests. By these means, the data requests of the plurality of nodes can be administered evenly throughout the time interval. Therefore, a data request storm at the collector node and a resulting overload of the network at the collector node or in its neighborhood can be avoided. Consequently, data packet collision and subsequent data packet loss can be prevented.

In case that a group of nodes will be addressed together more often, a multicast-group may be created by transmitting a broadcast message, e.g. in flooded mode. For instance, nodes, which require the same firmware update or which will receive the same trigger message, can be grouped as a multicast-group. The broadcast message for creating the multicast-group may include the addresses of the respective nodes as well as a multicast-group address. Instead of node or group addresses, also other identifying information may be used for addressing the node or group. Thus, the nodes, whose address (or identifying information) is included in the broadcast message, may store the multicast-group address (or identifying information of the multicast-group), so that they can be addressed as a member of a multicast-group.

In an alternative embodiment, at least one multicast-group address and/or at least one node address is included in the trigger message. Therefore, the trigger message may be flooded, but only the addressed nodes may send a data request to the collector node. This approach may be advantageous, if the nodes, to which the trigger message is directed, will not be used again or only very rarely in this combination. Possibly, the trigger message has to be split up into several sub-batches, e.g. if the number of node addresses exceeds an available payload of the trigger message. Then, each sub-batch of the trigger message may comprise different node addresses. The sub-batches may be processed sequentially, i.e. one after the other. That means that a subsequent sub-batch of the trigger message will be transmitted, after the collector node has received data requests from all nodes, which have been addressed in a previous sub-batch of the trigger message. Alternatively, the collector node may even delay the transmission of the next sub-batch, until all data requests of the previous sub-batch have been answered by transmitting the requested data to the respective nodes.

The system according to the present invention is particularly suited for a lighting system, since there, most data traffic is directed from the luminaire nodes to the collector node (N:1-traffic) and transmissions from the collector node to the luminaire nodes (1:N-traffic) occur less often. Due to reverse-route caching, data packet transmission from a collector node to other nodes can be improved, while keeping the system simple with respect to network setup and maintenance. Thus, in a preferred embodiment, at least some of the nodes and/or the collector node are associated with luminaire nodes of a lighting system. Furthermore, the system according of the present invention may be used in telemanagement of a lighting system, e.g. for switching on/off luminaire nodes, for controlling dimming patterns of luminaire nodes and/or for reporting data from the luminaire nodes. Employing a system according to the present invention for telemanagement of a lighting system will result in a high-performance lighting system with high scalability.

In another aspect of the present invention, a device for a node of a wireless mesh network is provided, the network comprising a plurality of nodes and at least one collector node. The device enables the corresponding node to store for a predetermined time at least a sender node information and a transmitting node information as reverse-route information, when or after receiving an uplink data packet directed to the collector node. The device may be associable with or installable in a node. Moreover, the device may enable a node to perform at least some of the other functions mentioned above for the system.

According to a further aspect of the present invention, a method for controlling data packet transmission in a wireless mesh network having at least one collector node and a plurality of nodes is provided. When an uplink data packet is transmitted to the collector node, a node or the collector node, which has received the uplink data packet, stores at least a sender node information and a transmitting node information as a reverse-route information for a predetermined time. By these means, a reverse route for downlink transmission from the collector node to the sender node of the uplink data packet may be cached.

BRIEF DESCRIPTION OF THE DRAWINGS

In the figures.

DETAILED DESCRIPTION

Preferred applications of the present invention are actuator networks, sensor networks or lighting systems, such as outdoor lighting systems (e.g. for streets, parking and public areas) and indoor lighting systems for general area lighting (e.g. for malls, arenas, parking, stations, tunnels etc.). In the following, the present invention will be explained further using the example of an outdoor lighting system for street illumination, however, without being limited to this application. In the field of lighting control, the telemanagement of outdoor luminaires via radio-frequency network technologies is receiving increasing interest, in particular solutions with applicability for large-scale installations with segments of above 200 luminaires.

Figure 1:
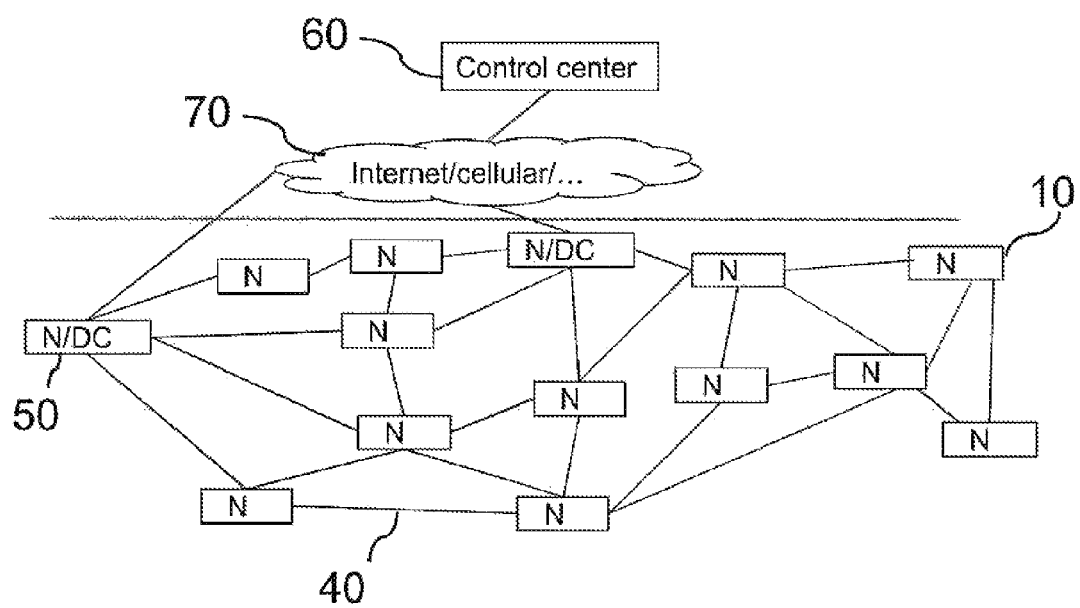
FIG. 1 illustrates an example of a wireless mesh network.

In FIG. 1, a typical network with mesh topology is shown. A plurality of nodes 10 (N) is connected one to another by wireless communication paths 40. Some of the nodes 10 function as collector nodes 50 (N/DC), which receive data packets from the surrounding nodes 10 via single-hop or multi-hop transmissions and transmit them to a control center 60 and vice versa. Thus, the collector nodes 50 may operate in the manner of gateways between the nodes 10 and the control center 60. Optionally, the collector nodes might act as control center themselves. The wireless communication paths 40 between the nodes 10 and collector nodes 50 may be constituted by RF transmissions, while the connection 70 between the collector nodes 50 and the control center 60 may make use of the Internet, mobile communication networks, radio systems or other wired or wireless data transmission systems. Therefore, the nodes 10 and the collector nodes 50 comprise a transceiving unit for transmitting or receiving data packets via wireless communication paths 40, e.g. via RF transmission. Since RF transmissions do not require high transmission power and are easy to implement and deploy, costs for setting up and operating a network using the device can be reduced. This is especially important for large RF networks, e.g. a RF telemanagement network for lighting systems. However, the data packet transmission may alternatively use infrared communication, free-space-visible-light communication or powerline communication. In the following, data packet transmitted from a node 10 to the collector node 50 are referred to as uplink data packets, whereas data packets transmitted from the collector node 50 to one or more nodes 10 are denoted downlink data packets. Moreover, when a data packet is addressed to all nodes 10 of the network, this is referred to as broadcasting, whereas a data packet directed to a group of nodes 10 is called a multicast or groupcast data packet. A data packet directed to a single node 10 is denoted a unicast data packet.

In a telemanagement system for lighting control, the number of luminaire nodes 10 is extremely high. Hence, the size of the network is very large, especially when compared to common wireless mesh networks, which typically contain less than 200 nodes. In addition, the nodes 10 typically have limited processing capabilities due to cost considerations, so that processing and memory resources in the luminaire nodes 10 will be limited. Thus, communication protocols for transmitting data packets between single nodes 10 should consider the limited resources for efficient and fast data packet transmission. Furthermore, compared to other so-called ad-hoc mesh networks, the telemanagement system for an outdoor lighting control network is stationary, i.e. the nodes 10 do not move. Also, all nodes 10 may be connected to mains power. Consequently, network changes will be mainly due to a changing environment, e.g. due to traffic. If the nodes 10 are stationary, the physical positions of the nodes 10, for instance GPS coordinates, may be known in the system, enabling geographic or position-based routing. Furthermore, telemanagement of an outdoor lighting system does not require a high data throughput. That means that a large part of the data traffic consists of time-uncritical data packets, e.g. status report data, statistical data, schedule updates or the like.

Moreover, in a lighting system such as a street lighting system, communication is very asymmetric. Most of the traffic is generated by the luminaire nodes 10, e.g. reporting their status, their dimming profile, sensor values or power usage to the control center 60. The other traffic consists of control commands from the control center 60 to the different nodes 10, e.g. for adjusting a dimming pattern or switching on/off lamps. The traffic from the control center 60, or data collector 50, to the nodes 10 consists of 1:N traffic, either in unicast, multicast or broadcast mode. However, most traffic is constituted by N:1 traffic (unicasts) in uplink transmission from the nodes 10 to the control center 60 or to the respective collector node 50. Hence, it is advantageous for such a system to optimize the uplink transmission.

Figure 2:
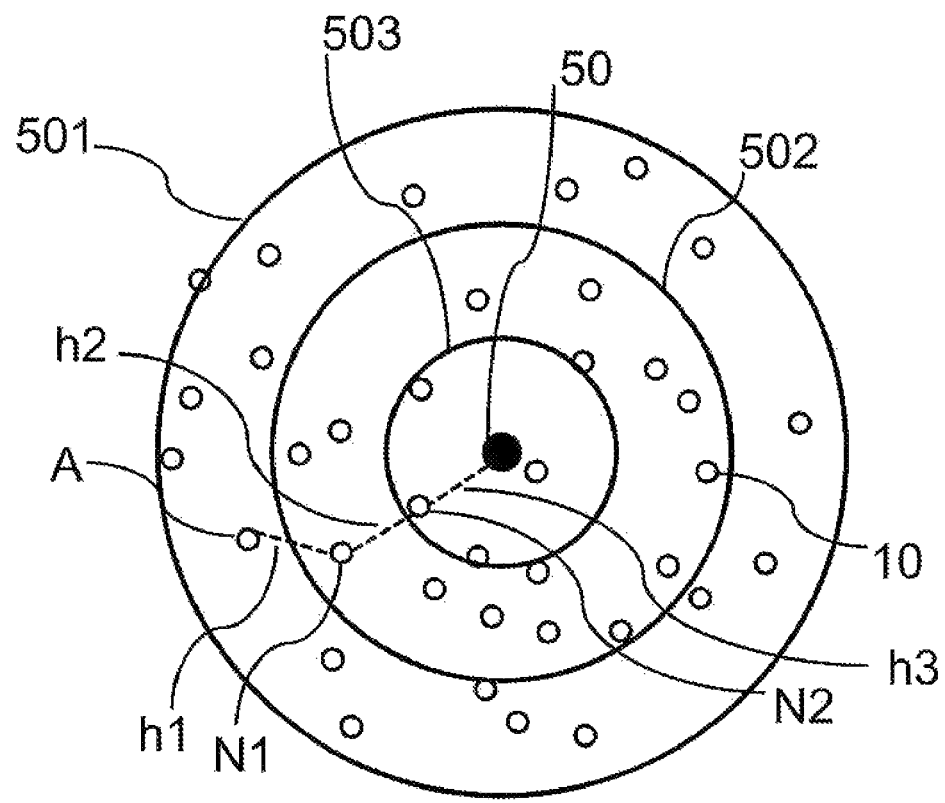
FIG. 2 illustrates a multi-hop transmission in a wireless mesh network.

In FIG. 2, a collector node 50 surrounded by a plurality of nodes 10 is shown, illustrating multi-hop unicast data transmission from a sender node A to the collector node 50 via a plurality of intermediate nodes N1 . . . Ni. The nodes 10 have different hop distances to the collector node 50 as indicated by radius 501, radius 502 and radius 503. For instance, a node A within radius 501, but outside radius 502 will need three hops h1, h2 and h3 for transmitting uplink data packets to the collector node 50, i.e. an uplink data packet has to be transmitted from this node A to the collector node 50 via an intermediate node N1 and an intermediate node N2. In contrast, a node 10 within radius 502, but outside radius 502, can transmit its uplink data packets in two hops to the collector node 50. Thus, a hop distance can be defined for every pair of a sender node A and the collector node 50. For data packet transmission from the luminaire nodes 10 to the collector nodes 50 (uplink), sink-distance vector routing is preferably employed, wherein every node 10 selects as intermediate node 10 a neighboring node 10 that is closer to one of the collector nodes 50. Here, a proactive routing structure can be adopted, since the routes to the collector nodes 50 are regularly used. In the proactive routing structure, a routing table is stored in every node 10, indicating which neighboring node 10 is closer to one of the collector nodes 50. Thus, data packets can be sent to the closest collector node 50 in a very efficient and fast way. Advantageously, each node 10 keeps information about multiple downlink neighboring nodes 10 as alternative routes in order to increase reliability. If one neighboring node 10 is not reachable due to strong interference or complete failure, then the routing protocol has additional alternatives to route the data packet to the collector node 50. Such collector-oriented protocols are simple and applicable also in large wireless mesh networks. Moreover, they have a low protocol overhead, thus reducing the network load.

Figure 3:
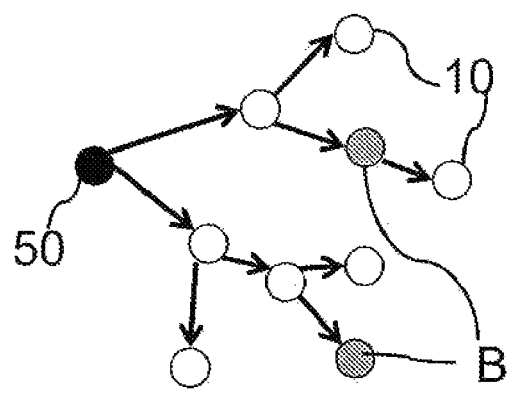
FIG. 3 schematically illustrates a flooded multicast transmission.

While it is worth to use efficient collector-oriented routing protocols for the uplink, downlink paths would be much more costly to create or maintain, since they are much less frequently used. Thus, downlink data packets are transmitted from the collector node 50 to one or more destination nodes B by flooding, as shown in FIG. 3. In a flooding process, data packets are forwarded to all luminaire nodes 10 in the network (arrows), but only the destination nodes B (shaded circles), whose node address is included in the flooded data packet, decode the data packet. This flooding approach can be applied to unicast, multicast or broadcast downlink data packets. Hence, in a system having these particular communication properties described above, a flooding protocol for downlink transmissions can be combined with a collector-oriented routing protocol for uplink transmissions. By these means, the system can be kept as simple as possible, while providing means for efficient data transmission.

Figures 4A, 4B, 4C:
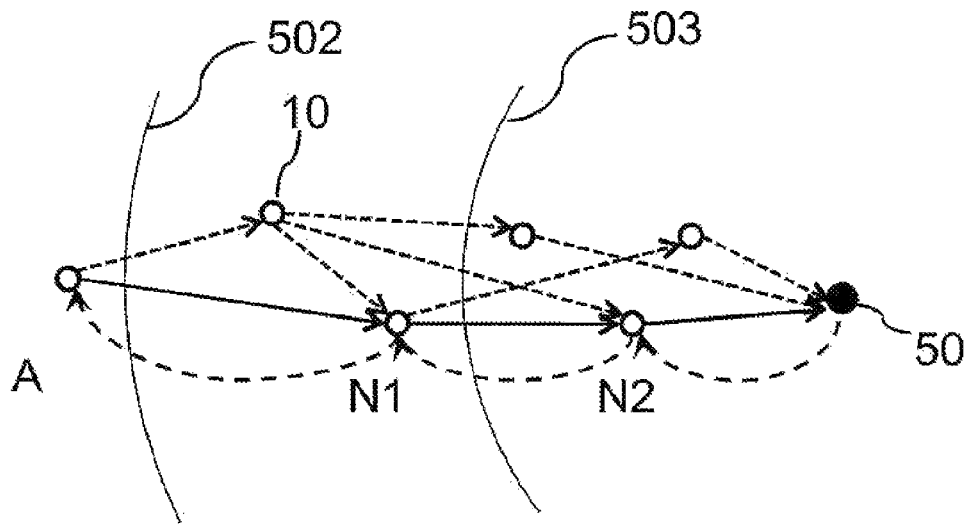
FIGS. 4A-C illustrate reverse-route caching.

However, flooding increases the network load drastically and is therefore a very inefficient way to transmit unicast or multicast data packets. Therefore, according to a preferred embodiment of the present invention, the efficient routing paths of an uplink transmission are used for a subsequent downlink transmission, in order to improve the efficiency of downlink transmissions. For this, reverse-route information is cached or temporarily stored, e.g. information identifying the sender node A and information identifying a previous transmitting node, from which the uplink data packet was received. For instance, as shown in FIG. 4A, an uplink data packet is transmitted from the sender node A to the collector node 50 in multi-hop mode via intermediate nodes N1 and N2 (solid arrows). The circular arcs 502 and 503 indicate again the hop distances from the respective nodes 10 to the collector node 50, whereas the dashed straight arrows indicate alternative routes for transmitting the uplink data packet. Every intermediate node Ni and the collector node 50 store the respective reverse-route information, when receiving the uplink data packet. In one example, the reverse-route information is stored in a routing table, as illustrated in FIG. 4B. Thus, when a node 10 receives an uplink data packet directed to the collector node 50, the node 10 stores a sender node information and a transmitting node information as destination node information and next node information, respectively. Due to the limited memory space or route cache in the nodes 10, the reverse-route information is only stored for a short time period, so that they can only be used for immediate answering or acknowledging of the uplink data packet. Therefore, when a node 10 receives a downlink data packet to be forwarded, the node 10 compares the destination node information included in the downlink data packet with the destination node information stored as reverse-route information in a route cache of the node 10. If it is determined that a destination node information corresponding to the destination node of the downlink data packet is available, the corresponding next node information is retrieved, in order to forward the downlink data packet to a next node 10, which corresponds to the next node information.

In FIG. 4C, the reverse-route information stored at the respective nodes is shown for the example of FIG. 4A. Thus, after node N1 has received an uplink data packet directed to the collector node 50 from the sender node A, node N1 stores an address or other identifying information of node A as destination node information and as next node information, since for node N1 node A is both, the original sender node and the transmitting node. Then, node N1 forwards the uplink data packet to the next node N2 according to the sink-distance vector routing protocol. After having received the uplink data packet from node N1, node N2 stores the address of node A as destination node information and the address of node N1 as next node information in its route cache. Next, node N2 forwards the uplink data packet to the collector node 50, which caches the address of node A as destination node information and N2 as next node information for downlink transmissions to node A. For instance, if the uplink data packet has to be acknowledged by the collector node 50, the acknowledgement can now be sent the reverse way as the uplink data packet by using the reverse-route information stored at the respective nodes (curved dashed arrows in FIG. 4A). Thus, the collector node 50 checks its route cache for reverse-route information comprising a destination node information that corresponds to node A. If there is a destination node information corresponding to the destination node of the acknowledgement, i.e. to node A, the corresponding next node information of the reverse-route information is used for transmitting the acknowledgement to the corresponding next node 10. In the example given, the collector node 50 will forward the acknowledgement directed to destination node A to intermediate node N2. Likewise, intermediate node N2 will check its route cache for reverse route information corresponding to the destination node A of the acknowledgement. If there is still a destination node information corresponding to node A stored at N2, intermediate node N2 will determine that according to the next node information, the acknowledgement has to be forwarded to intermediate node N1. For node N1, the destination node information and the next node information will be the same, i.e. both will correspond to node A. Thus, the intermediate node N1 transmits the acknowledgement to destination node A. In other words, every node 10 forwarding an uplink data packet towards the collector node 50 stores an entry in its route cache with the packet originator node as destination node and with the node 10, which has transmitted the uplink data packet last to the receiving node 10, as next forwarding node towards this destination node. Of course, the same method can be applied to other kind of downlink data packets and is not limited to the transmission of acknowledgements. By these means, reverse routes towards network nodes 10 can be cached for a predetermined time. Thus, the communication path from the collector node 50 towards an individual node 10 can be optimized only, when the node 10 initiates the communication.

Since in large-scale networks with thousands of resource-limited nodes 10, only a fraction of reverse routes for downlink transmission can be cached, resulting in a limited lifetime of the reverse routes. The time interval, for which the reverse routes are cached at a node 10, may depend on the respective node 10. For instance, the length of the time interval can be set corresponding to a proximity of the respective node 10 to the collector node 50. Thus, a node 10 close to the collector node 50 may cache the reverse-route information for a shorter time interval than a node 10 being far from the collector node 50. This is in particular advantageous, since a node 10 close to the collector node 50 will be much more often involved in forwarding uplink data packets to the collector node 50 and will therefore have to cache much more reverse routes. In contrast, a node 10 being far from the collector node 50 will function less often as a forwarding node in uplink transmission. Moreover, for a node 10 close to the collector node 50, the time is much shorter, which is required in average for forwarding the data packet to the collector node 50 and for receiving a subsequent data packet from the collector node 50 to be forwarded using the reverse-route information. Therefore, the cache time interval of a node 10 close to the collector node 50 does not need to be as long as that of a node 10 far from the collector node 50. Preferably, the cache time is at least as long as the time required to transmit the uplink data packet from the respective node 10 to the collector node 50 and to receive an immediately returned acknowledgement from the data collector 50. Thus, the cache time may be at least the time required in average for a roundtrip from the respective node 10 to the collector node 50 and back. This roundtrip time may be learned from unicast messages, which the respective node 10 itself sends to the collector node 50 in acknowledge mode, e.g. by keeping a counter. In the beginning, the roundtrip time may be set to high default values, but when the roundtrip time is determined more accurately at the node 10, it can be reduced.

In order to exploit the reverse-route caching more efficiently, the collector node 50 can cache a downlink data packet to a node 10, if a regular uplink data packet is expected from this node 10 soon, e.g. a scheduled data report or the like. The cache time or delay of the data packet may depend on the time sensitivity of the uplink data packet. For instance, if the uplink data packet is time-uncritical or delay-insensitive, the uplink data packet can be delayed for a longer time then a time-critical data packet. This approach of caching downlink data packets is in particular beneficial for transmitting new on/off schedules to luminaire nodes 10 of a lighting system. New schedules may be created during daytime, but need not to be transmitted immediately, since they usually come only into effect, when it gets dark. Thus, the schedules can be stored at the collector node 50, until an uplink data packet has been received from the respective luminaire node 10. Then, the new schedule can be transmitted as a downlink data packet to the luminaire node 10 using the reverse-route information. This avoids costly unicast communication by flooding towards the individual luminaire nodes 10.

Figure 5:
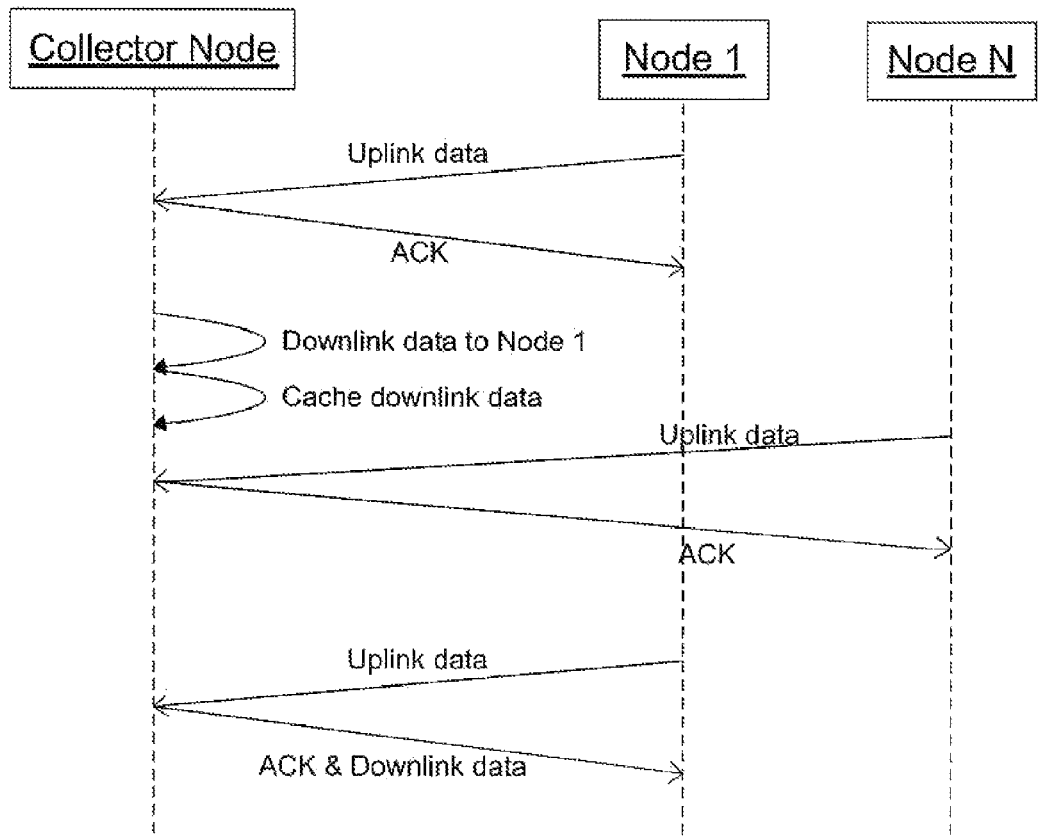
FIG. 5 illustrates a process of delaying a transmission of a downlink data packet.

In FIG. 5, another example of this process is shown. Here, uplink data transmission is performed in acknowledged mode, i.e. an acknowledgement is returned from the destination node back to the sender node. Thus, after the collector node 50 has received an uplink data packet from node 1, it transmits an acknowledgement ACK back to node 1 as long as the reverse route is still available. When the collector node 50 has downlink data to be sent to node 1, the collector node 50 can cache the downlink data packet for a predetermined time. If an uplink data packet is then received from node 1, the collector node 50 transmits the acknowledgement of the uplink data packet and the cached downlink data packet to node 1. Here, the downlink data packet and the acknowledgement can be transmitted as one combined downlink data packet via the reverse route of the uplink data packet, in order to save network resources. Alternatively, e.g. if the packet size were too large, the downlink data packet and the acknowledgement can be sent separately one after the other within the time period, during which the reverse route to node 1 is available. Thus, the downlink data packet can also be transmitted immediately before or after transmitting the acknowledgement. In all cases, the reverse route is still available, so that the combined data packet or the acknowledgement and the downlink data packet are transmitted via the same intermediate nodes back to node 1, which the uplink data packet has passed. As mentioned before, this method is also applicable to non-acknowledged transmission modes.

Figure 6A:
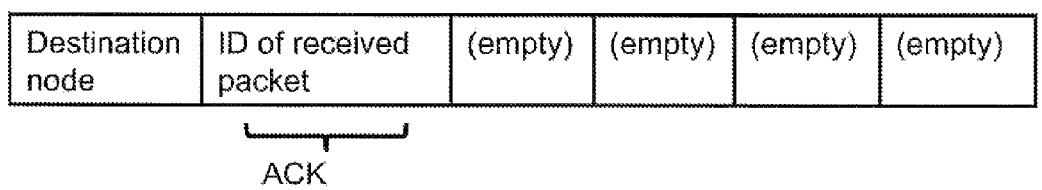
FIG. 6A exemplarily illustrates a structure of an acknowledgement data packet.
Figure 6B:
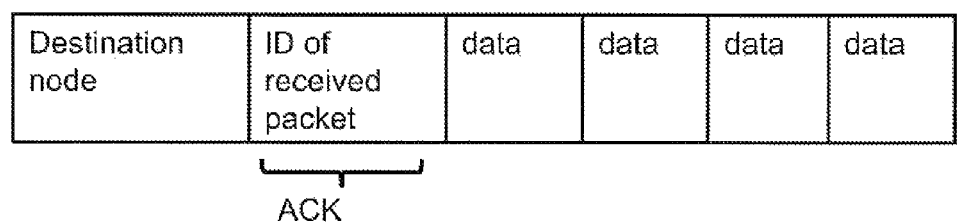
FIG. 6B exemplarily illustrates an acknowledgement data packet comprising further data.

In FIG. 6A, a structure of an acknowledgement data packet is exemplified. In general, an acknowledgement data packet requires a full header overhead, i.e. information about the destination node, to which the acknowledgement has to be sent. However, the acknowledgement does not need much payload, since it usually only comprises identity information of the acknowledged data packet, e.g. a packet type and a sequence number. Hence, although the full physical layer (PHY), MAC layer and network layer header overhead is required for the acknowledgement, the acknowledgement does not comprise much payload, leaving the remaining transmission capacity of the data packet empty. Hence, the ratio between header overhead and payload is disadvantageous for acknowledgements, thereby decreasing the network efficiency. In order to use the header overhead more efficiently, the acknowledgement data packet can be filled up with other data that has also to be sent to the destination node, as shown in FIG. 6B. For instance, as described above, the acknowledgement can be combined with a cached downlink data packet. By these means, the network load can be reduced, since the header overhead is needed only once. This is also called piggybacking.

Figure 7:
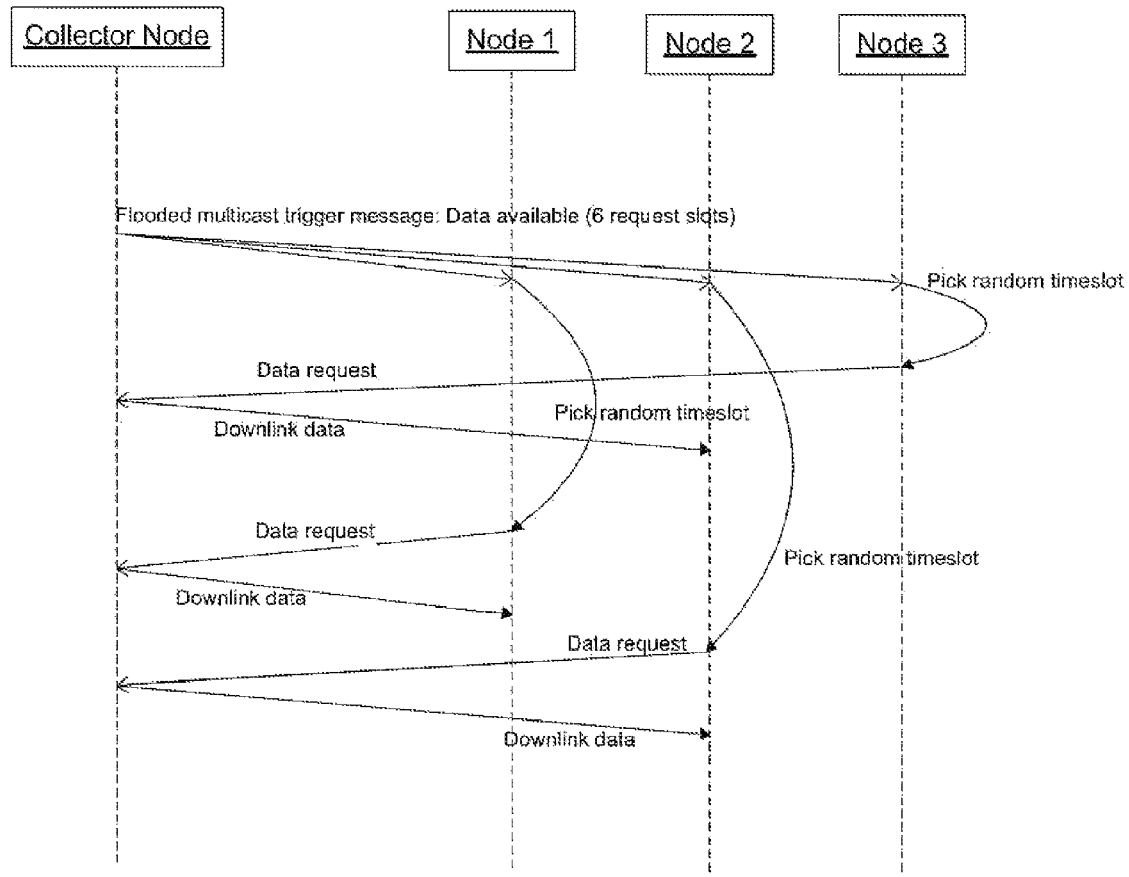
FIG. 7 illustrates a process of requesting downlink data in response to a trigger message.

In FIG. 7, another process for exploiting reverse-route caching is illustrated. Here, data is available at the collector node 50, such as new lighting schedules, firmware updates, dimming patterns or other configuration information for one or more luminaire nodes 10. Instead of flooding a unicast, multicast or broadcast data packet including the data, the collector node 50 floods a trigger message indicating that data is available at the collector node 50. The flooded trigger message can be a unicast, multicast or broadcast data packet and includes the corresponding addressing, depending on whether the data should be delivered to a single node 10, to a group of nodes 10 or to all nodes 10 of the network. By these means, the nodes 10 are triggered to request data from the collector node 50, in order to create the temporary reverse route. Thus, instead of using n inefficient flooded unicasts to transmit the data from the collector node 50 to n nodes 10 followed by n (efficient) acknowledgements, only one trigger message is flooded in order to trigger n efficient data requests from the n nodes 10, which enable each an efficient reply with a downlink data packets including the requested data. Hence, only one flooded multicast (or broadcast) and 2$n$ unicasts are needed for loading updates to n single nodes 10.

In FIG. 7, the multicast trigger message comprises a time interval indicating to the destination nodes 10, within which time period data requests should be transmitted to the collector node 50. In the example given, the trigger message comprises a time interval with six request slots. Each node 10, which is addressed in the multicast trigger message, chooses a time slot at random and transmits a data request to the data collector 50 within the selected time slot. In response to the data request, the collector node 50 returns a downlink data packet delivering the requested data to the respective node 10. By randomly choosing a time slot within the time period specified in the trigger message, congestion and packet collision can be avoided.

Figure 8:
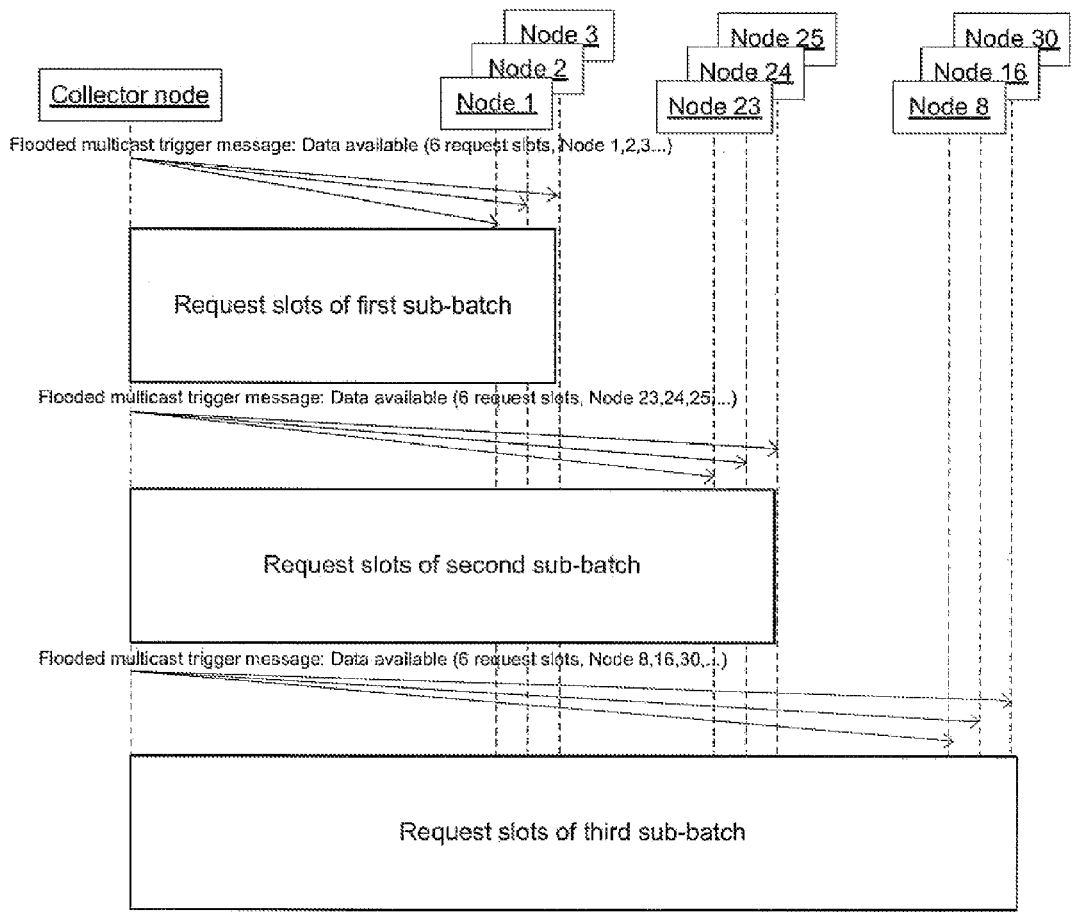
FIG. 8 illustrates another process of requesting downlink data in response to a trigger message.

In case that the update data should be transmitted to nodes 10, which are not yet in a multicast-group, the multicast-group has to be created first. This can be done by flooding a broadcast message including network addresses or other identifying information of the respective nodes 10, which should be included in the new multicast-group. However, since this causes a lot of network traffic, this process is only advantageous, if the newly generated multicast-group will be used again in future. For a group of nodes 10, which have to be addressed only once, it may be more advisable to include the network addresses (or identifying information) of the respective nodes 10 in the trigger message. Since the available payload of a data packet is limited (see FIG. 6), e.g. 20-25 4-byte addresses in an IEEE 802.15.4 data packet, the trigger message can only include a limited number of node addresses. If the number of nodes 10 is too large, the trigger message can be split into multiple sub-batches, each comprising different node addresses and time intervals, within which the addressed nodes 10 have to send their data request. This is illustrated in FIG. 8. In the example shown, the collector node 50 sends a first sub-batch trigger message as a flooded multicast to nodes 1, 2 and 3 including a time interval with six request slots of the first sub-batch. Nodes 1, 2 and 3 select one of the six request slots at random and transmit their data requests accordingly. After having received the data request from a node 10, the collector node 50 transmits the requested data to the respective node 10 using the reverse route of the data request, as described before. Then, the same process is repeated for the other sub-batches. Preferably, the next sub-batch trigger message is transmitted, after the collector node 50 has answered to the last data request of the previous sub-batch. By these means, the collector node 50 does not have to wait until the total time interval for the previous sub-batch has passed, but it can start transmitting the next sub-batch trigger message immediately, after the last node of the previous sub-batch has requested its data packet. Since nodes 10 of one sub-batch choose randomly a request slot within the time interval specified in the trigger message and since the data requests of the different sub-batches do not overlap, data collision at the collector node 50 and in its surroundings can be avoided, thus preventing data loss and congestion.

Therefore, according to the present invention, application or transport layer protocols are adapted in order to make efficient use of underlying networking protocols, e.g. using cross-layer communication. By combining two simple protocols, i.e. flooding and sink-distance vector routing, a system and a method for data transmission in a wireless network are provided, wherein downlink data transmission from the collector node is optimized. This is achieved by temporarily storing reverse-route information in nodes along an uplink transmission route. By delaying a transmission of a downlink packet at the collector node, when an uplink data packet is expected, or by triggering individual nodes to transmit data requests, this principle can even be further exploited. In addition, when the uplink data packet has to be acknowledged by the collector node, further data can be included in the acknowledgement data packet. By these means, network resources can be more efficiently utilized, thus increasing the scalability of the network.

The invention claimed is:

1. A system for controlling data packet transmission in a wireless mesh network, comprising:
    at least one collector node; and
    a plurality of nodes;
    wherein a node and/or the at least one collector node receiving an uplink data packet addressed to the at least one collector node is configured to store at least a sender node information of a sender node that initially had transmitted the uplink data packet and a transmitting node information of a transmitting node that had received the uplink data packet transmitted from the sender node or from an intermediary node for transmitting the uplink data packet to the node and/or the at least one collector node as a reverse-route information for a predetermined time, wherein the predetermined time, for which the reverse route information is stored at the sender node, depends on a distance of the sender node to the at least one collector node, and wherein the reverse-route information of each node of the plurality of nodes and the at least one collector node are devoid of information related to the intermediary node,
    wherein the at least one collector node is adapted to broadcast and/or multicast a trigger message to one or more nodes, indicating that data is available at the at least one collector node, wherein the trigger message is split into several sub-batches, each sub-batch comprising different node addresses, and wherein the sub-batches are processed sequentially, wherein the multicast trigger message comprises a time interval and request slots, indicating to the destination nodes the time period in which data requests are transmitted to the at least one collector node, and wherein a node having received the trigger message is adapted to randomly select a time slot within a time interval specified in the trigger message for sending a data request to the at least one collector node.

2. The system according to claim 1, wherein a downlink data packet is transmitted from the at least one collector node to the sender node via a reverse of a route of the uplink data packet using the reverse-route information.

3. The system according to claim 1, wherein when expecting an uplink data packet from the sender node, the at least one collector node is adapted to delay a transmission of a downlink data packet to the sender node, until the uplink data packet is received.

4. The system according to claim 1, wherein a node receiving a downlink data packet is adapted to select a transmission mode for forwarding the downlink data packet based on an availability of the reverse-route information.

5. The system according to claim 1, wherein the uplink data packet comprises a data field indicating whether the reverse-route information is to be stored and/or indicating the predetermined time, for which the reverse-route information is to be stored.

6. The system according to claim 1, wherein a node is adapted to store the reverse-route information until receiving a downlink data packet, which is to be forwarded to the sender node and which comprises an erase information.

7. The system according to claim 1, wherein a downlink data packet and an acknowledgement of the uplink data packet are transmitted to the sender node as one data packet or wherein the downlink data packet is transmitted separately within a predetermined time interval before or after transmitting the acknowledgement of the uplink data packet.

8. A device for a node of a wireless mesh network, the network comprising a plurality of nodes and at least one collector node, wherein the device comprises:
a memory; and
a processor configured to store in the memory for a predetermined time at least a sender node information of a sender node that initially had transmitted an uplink data packet and a transmitting node information of a transmitting node that had received the uplink data packet transmitted from the sender node or from an intermediary node for transmitting the uplink data packet to a further node or to the least one collector node as reverse-route information, after the uplink data packet directed to the at least one collector node has been received by the node,
wherein the predetermined time, for which the reverse route information is stored at the sender node, depends on a distance of the sender node to the at least one collector node, and wherein the reverse-route information of each node between the sender node and the at least one collector node are devoid of information related to the intermediary node, wherein the at least one collector node is adapted to broadcast and/or multicast a trigger message to one or more nodes, indicating that data is available at the at least one collector node, wherein the trigger message is split into several sub-batches, each sub-batch comprising different node addresses, and wherein the sub-batches are processed sequentially, wherein the multicast trigger message comprises a time interval and request slots, indicating to the destination nodes the time period in which data requests are transmitted to the at least one collector node, and wherein a node having received the trigger message is adapted to randomly select a time slot within a time interval specified in the trigger message for sending a data request to the at least one collector node.

9. A method for controlling data packet transmission in a wireless mesh network, comprising at least one collector node and a plurality of nodes, wherein the method comprises the acts of:
receiving at a node or at the at least one collector node an uplink data packet addressed to the at least one collector node; and
storing in a memory of the node or of at the at least one collector node for a predetermined time at least a sender node information of a sender node that initially had transmitted the uplink data packet and a transmitting node information of a transmitting node that had received the uplink data packet transmitted from the sender node or from an intermediary node for transmitting the uplink data packet to the node and/or the at least one collector node as a reverse-route information, wherein the predetermined time, for which the reverse route information is stored at the sender node, depends on a distance of the sender node to the at least one collector node, and wherein the reverse-route information of each node of the plurality of nodes and the at least one collector node are devoid of information related to the intermediary node, wherein the at least one collector node is adapted to broadcast and/or multicast a trigger message to one or more nodes, indicating that data is available at the at least one collector node, wherein the trigger message is split into several sub-batches, each sub-batch comprising different node addresses, and wherein the sub-batches are processed sequentially, wherein the multicast trigger message comprises a time interval and request slots, indicating to the destination nodes the time period in which data requests are transmitted to the at least one collector node, and wherein a node having received the trigger message is adapted to randomly select a time slot within a time interval specified in the trigger message for sending a data request to the at least one collector node.

10. The system according to claim 1, wherein at least some of the nodes and/or at least one collector nodes are associated with luminaires of a lighting system.

11. The system according to claim 10, wherein the system is used in telemanagement of a lighting system for switching on/off and/or controlling dimming patterns of luminaire nodes and/or for reporting sensor data and/or luminaire status data.

* * * * *